(12) United States Patent
Martin

(10) Patent No.: US 11,117,787 B2
(45) Date of Patent: Sep. 14, 2021

(54) ELEVATOR SHEAVE LINER

(71) Applicant: OTIS ELEVATOR COMPANY, Farmington, CT (US)

(72) Inventor: Kyle B. Martin, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 107 days.

(21) Appl. No.: 16/518,105

(22) Filed: Jul. 22, 2019

(65) Prior Publication Data

US 2021/0024331 A1    Jan. 28, 2021

(51) Int. Cl.
*B66B 15/04* (2006.01)
*B66B 15/02* (2006.01)
*F16H 55/50* (2006.01)

(52) U.S. Cl.
CPC .............. *B66B 15/04* (2013.01); *B66B 15/02* (2013.01); *F16H 55/50* (2013.01)

(58) Field of Classification Search
CPC ......... B66B 15/02; B66B 15/04; F16H 55/50; B66D 3/04; B66D 3/043
See application file for complete search history.

(56) References Cited

U.S. PATENT DOCUMENTS

| | | | | |
|---|---|---|---|---|
| 244,976 A * | 8/1881 | Bilby | ..................... | F16H 55/50 474/177 |
| 905,756 A * | 12/1908 | Skinner | .................. | F16H 57/05 474/91 |
| 1,780,627 A * | 11/1930 | Muller | .................... | B61B 12/02 295/31.1 |
| 1,935,975 A * | 11/1933 | Donandt | .................. | B66D 3/10 242/610 |
| 2,137,987 A * | 11/1938 | Smith | ....................... | F16H 7/18 474/177 |
| 3,142,997 A * | 8/1964 | Rampe | .................... | F16H 55/56 474/44 |
| 3,934,482 A * | 1/1976 | Byers | ...................... | B63B 21/56 474/9 |
| 4,366,609 A * | 1/1983 | Speer | ................. | B29C 45/1418 264/266 |
| 4,441,692 A * | 4/1984 | Kovaleski | ............... | B66D 3/08 254/390 |
| 4,640,496 A * | 2/1987 | Van Hoomissen | ....... | E02F 3/58 254/415 |
| 9,212,029 B2 * | 12/2015 | Aulanko | ................. | B66B 15/04 |

(Continued)

FOREIGN PATENT DOCUMENTS

CH     376725 A    4/1964
DE     810216 C    8/1951
(Continued)

OTHER PUBLICATIONS

Extended European Search Report for Application EP 19216913.4 dated Jul. 22, 2020.

*Primary Examiner* — Michael E Gallion
(74) *Attorney, Agent, or Firm* — Carlson, Gaskey & Olds

(57) ABSTRACT

An illustrative example embodiment of elevator sheave liner includes a rigid central portion made of a first material and a resilient outer portion made of a second material. The central portion defines a traction surface that is configured to receive an elevator tension member. The outer portion defines an engagement surface that is configured to secure the sheave liner to an elevator sheave.

18 Claims, 2 Drawing Sheets

(56) References Cited

U.S. PATENT DOCUMENTS

| | | | | |
|---|---|---|---|---|
| 9,352,935 | B2* | 5/2016 | Baranda | B66B 7/06 |
| 10,766,746 | B2* | 9/2020 | Hubbard | B66B 15/04 |
| 2001/0039985 | A1* | 11/2001 | Johnson | F16H 55/36 |
| | | | | 152/70 |
| 2012/0318615 | A1* | 12/2012 | Aulanko | B66B 15/04 |
| | | | | 187/254 |
| 2014/0291030 | A1* | 10/2014 | Urquhart | E21B 19/08 |
| | | | | 175/203 |
| 2020/0055696 | A1* | 2/2020 | Hubbard | B66B 15/04 |
| 2020/0088288 | A1* | 3/2020 | Goldenberg | F16H 55/50 |
| 2020/0207595 | A1* | 7/2020 | Hatfield | A43C 7/04 |

FOREIGN PATENT DOCUMENTS

| | | |
|---|---|---|
| DE | 1081285 B | 5/1960 |
| DE | 1098026 B | 1/1961 |
| EP | 0185531 A1 | 6/1986 |
| FR | 2669701 A1 | 5/1992 |

* cited by examiner

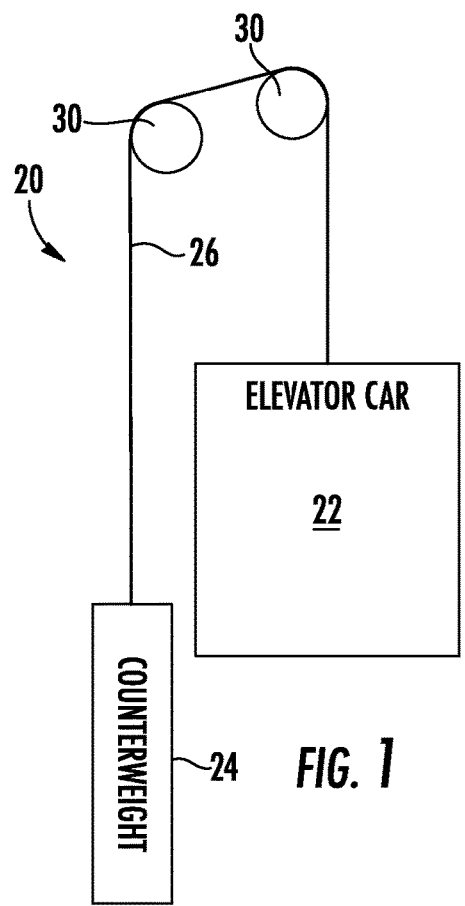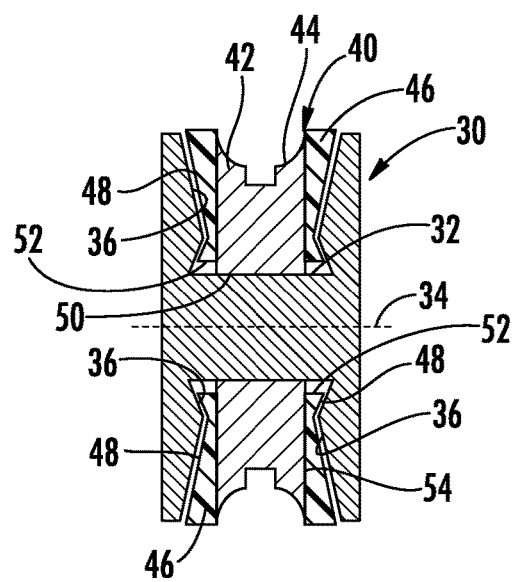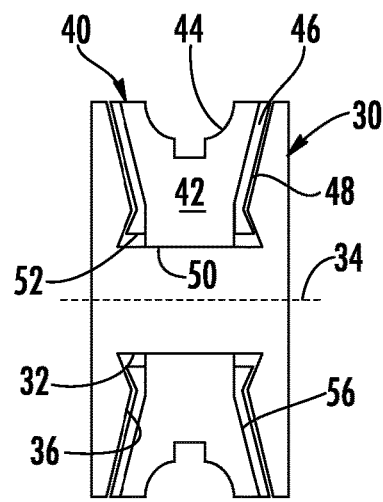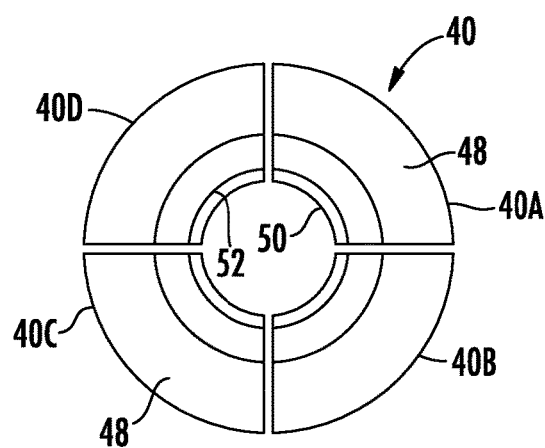
FIG. 1
FIG. 2
FIG. 3
FIG. 4

ELEVATOR SHEAVE LINER

BACKGROUND

Elevator systems are useful for carrying passengers and items between different levels of a building. Many elevator systems are traction-based and include roping that suspends the elevator car and a counterweight. A machine causes movement of a traction sheave that, in turn, causes movement of the roping for moving the elevator car as desired. The roping typically follows a path that includes several sheaves.

Elevator sheaves include a surface that engages the roping and, therefore, is subject to wear over time. Various approaches have been used in the industry to address such wear. For example, plastic sheave liners have been used to establish a desired level of traction. The plastic sheave liners are less expensive than a cast iron sheave and replacing such liners is more economical than replacing or reconditioning an entire sheave. While such liners do provide some advantages, they are not without drawbacks.

SUMMARY

An illustrative example embodiment of an elevator sheave liner includes a rigid central portion made of a first material and a resilient outer portion made of a second material. The central portion defines a traction surface that is configured to receive an elevator tension member. The outer portion defines an engagement surface that is configured to secure the sheave liner to an elevator sheave.

In an example embodiment having one or more features of the elevator sheave liner of the previous paragraph, the first material comprises metal and the second material comprises a polymer.

In an example embodiment having one or more features of the elevator sheave liner of any of the previous paragraphs, the second material comprises an elastomer.

In an example embodiment having one or more features of the elevator sheave liner of any of the previous paragraphs, the second material comprises a thermoplastic polyurethane.

In an example embodiment having one or more features of the elevator sheave liner of any of the previous paragraphs, the central portion is a casting and the first material comprises iron.

In an example embodiment having one or more features of the elevator sheave liner of any of the previous paragraphs, the engagement surface comprises a dovetail profile.

In an example embodiment having one or more features of the elevator sheave liner of any of the previous paragraphs, the outer portion is over-molded onto the central portion.

An illustrative example embodiment of an elevator sheave assembly includes a sheave having a first surface parallel to an axis of rotation of the sheave. Aa rigid sheave liner is made of a first material, has an inner surface received adjacent the first surface, and has an outer surface defining a traction surface that is configured to receive an elevator tension member. A resilient layer made of a second material is secured to one of the sheave and the rigid sheave liner. The resilient layer is between the sheave and the rigid sheave liner. The resilient layer has an exterior profile that cooperates with surfaces on the other of the rigid sheave liner and the sheave to secure the rigid sheave liner to the sheave.

In an example embodiment having one or more features of the elevator sheave assembly of the previous paragraph, the resilient layer is secured to the rigid sheave liner, the sheave includes retaining surfaces that are transverse to the first surface, the retaining surfaces have a dovetail profile, the exterior profile of the resilient layer defines engagement surfaces that engage the retaining surfaces, and the engagement surfaces have a corresponding dovetail profile.

In an example embodiment having one or more features of the elevator sheave assembly of any of the previous paragraphs, the sheave liner includes an inner surface received adjacent the first surface of the sheave, the inner surface is situated at a first radial distance from the axis of rotation, the outer portion includes an inner ledge, and the inner ledge is situated at a second, larger radial distance from the axis of rotation.

In an example embodiment having one or more features of the elevator sheave assembly of any of the previous paragraphs, the sheave liner is snap-fit onto the sheave.

In an example embodiment having one or more features of the elevator sheave assembly of any of the previous paragraphs, the first material comprises metal and the second material comprises a polymer.

In an example embodiment having one or more features of the elevator sheave assembly of any of the previous paragraphs, the second material comprises an elastomer.

In an example embodiment having one or more features of the elevator sheave assembly of any of the previous paragraphs, the second material comprises a thermoplastic polyurethane.

In an example embodiment having one or more features of the elevator sheave assembly of any of the previous paragraphs, the rigid sheave liner comprises a casting and the first material comprises iron.

In an example embodiment having one or more features of the elevator sheave assembly of any of the previous paragraphs, the resilient layer is over-molded onto the one of the sheave and the rigid sheave liner.

In an example embodiment having one or more features of the elevator sheave assembly of any of the previous paragraphs, the resilient layer is secured to the sheave, the exterior profile includes retaining surfaces that are transverse to the first surface, and the rigid sheave liner has an exterior that includes engagement surfaces that engage the retaining surfaces.

In an example embodiment having one or more features of the elevator sheave assembly of any of the previous paragraphs, the retaining surfaces establish a dovetail profile and the engagement surfaces establish a corresponding dovetail profile.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 1 schematically illustrates selected portions of an elevator system.

FIG. 2 schematically illustrates an example elevator sheave and sheave liner assembly.

FIG. 3 schematically illustrates another an example elevator sheave and sheave liner assembly.

FIG. 4 is a side view of a sheave liner comprising multiple pieces.

DETAILED DESCRIPTION

Figure 5:
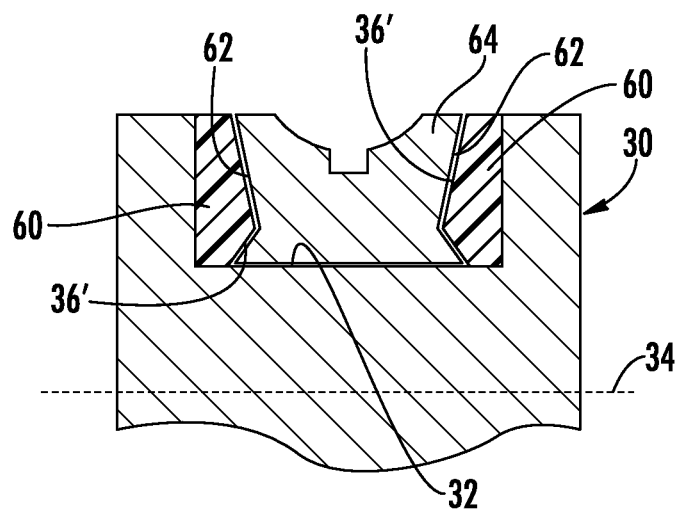
FIG. 5 schematically illustrates another embodiment of an elevator sheave and sheave liner assembly.

FIG. 1 schematically illustrates selected portions of an elevator system 20. An elevator car 22 is coupled to a counterweight 24 by roping 26. Although not shown in detail, the roping 26 includes a plurality of tension members, such as round steel ropes or flat belts. The roping 26 follows a path defined, at least in part, by sheaves 30. At least one of the sheaves 30 is a traction sheave associated with a machine (not illustrated) that selectively causes movement of the roping 26 to control the movement and position of the elevator car 22 for providing elevator service to passengers.

At least the sheave 30 that is the traction sheave comprises a sheave assembly, such as that shown in FIG. 2. The sheave 30 includes a sheave body having a first surface 32 that is aligned parallel with an axis of rotation 34 of the sheave 30. A plurality of retaining surfaces 36 are transverse to the first surface 32. The retaining surfaces 36 in the illustrated example have a dovetail profile.

A sheave liner 40 includes a rigid central portion 42 that defines a traction surface 44 configured to engage a tension member of the roping 26. In the illustrated example, the traction surface 44 is configured for engaging a round steel rope. The sheave liner 40 includes a resilient outer portion 46 that includes engagement surfaces 48 that engage the retaining surfaces 36 on the sheave 30. The engagement surfaces 48 have a mating or corresponding dovetail profile such that the sheave liner 40 is retained in place on the sheave 30 by the cooperation of those surfaces.

The central portion 42 is made of a first material and the outer portion 46 is made of a second, different material. In the illustrated example embodiment, the central portion 42 is made of metal, such as iron or nickel, and the outer portion 46 is made of a compressible polymer material. The outer portion 46 comprises an elastomer in some embodiments. One example embodiment of the outer portion 46 comprises thermoplastic polyurethane.

The resilient outer portion 46 allows for the sheave liner 40 to be inserted in place on the sheave 30 by manipulating the sheave liner 40 in a direction toward the center or axis of rotation 34 of the sheave 30. In some examples, the sheave liner 40 is snapped into place on the sheave 30.

The central portion 42 includes an inner surface 50 that is received against the first surface 32 when the sheave liner 40 is appropriately situated on the sheave 30. The outer portion 46 includes an inner ledge 52 that is spaced from the inner surface 50 so that the inner surface 50 is situated a first radial distance from the axis of rotation 34 and the inner ledge 52 is situated at a second, larger radial distance from the axis of rotation 34. The position of the inner ledge 52 relative to the inner surface 50 provides clearance so that the outer portion 46 does not interfere with the central portion 42 being properly seated against the first surface 32 of the sheave 30.

In the example of FIG. 2, the outer portion 46 is overmolded onto an outer surface 54 of the central portion 42. The outer surface 54 includes a texture or configuration that facilitates securing the resilient material of the outer portion 46 onto the central portion 42. In another embodiment the outer portion 46 comprises separate pieces that are secured to the outer surfaces 54.

FIG. 3 illustrates another example embodiment in which the outer surface 56 of the central portion 42 has a different configuration to accommodate more metal around the traction surface 44 compared to the embodiment of FIG. 2.

One feature of including the resilient outer portion 46 is that the engagement surfaces 48 can be established during the process of molding the outer portion 46. There is no need for complex or detailed machining of the outer surface 54, 56 of the central portion 42. The resilient outer portion 46 ensures proper engagement with the retaining surfaces 36 on the sheave 30.

FIG. 4 is a side view of an example sheave liner configuration in which the sheave liner 40 includes four arcuate portions 40A, 40B, 40C and 40D. Each of those portions 40A-40D are snap-fit onto the sheave 30 and collectively establish a sheave liner 40 that extends around the entire circumference of the sheave assembly.

FIG. 5 shows another example embodiment that includes the resilient portion secured to the sheave rather than to the liner. The sheave 30 in this example embodiment includes a rigid, metal body similar to those of the previously described embodiments but the retaining surfaces 36' are defined by a layer of resilient material 60. The retaining surfaces 36' have a dovetail configuration that is complementary to an exterior, engaging surface 62 on the sheave liner 64. The layer of resilient material 60 may be overmolded onto the sheave body or secured by fasteners such as screws. The sheave liner 64 comprises arcuate sections that can be snap-fit into position about the sheave. The compliance of the layer of resilient material 60 allows for the sheave liner 64 to be installed or removed for replacement in a convenient manner.

Sheave assembly and sheave liner embodiments consistent with those described above provide the economic benefits of having sheave liners that can be replaced without having to replace an entire sheave. Additionally, a metal central portion provides the durability of a cast iron or other metal material while the outer portion 46 eliminates the need for precise machining of the surfaces that engage the sheave to retain the sheave liner in place. The disclosed example embodiment and others like them also provide the ability to use a wider variety of materials compared to previous sheave liners.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator sheave liner, comprising:
   a rigid central portion made of a first material, the central portion defining a traction surface that is configured to receive an elevator tension member; and
   a resilient outer portion made of a second material, the outer portion defining an engagement surface that is configured to secure the sheave liner to an elevator sheave wherein the first material comprises metal;
   and the second material comprises a polymer.

2. The elevator sheave liner of claim 1, wherein the second material comprises an elastomer.

3. The elevator sheave liner of claim 1, wherein the second material comprises a thermoplastic polyurethane.

4. The elevator sheave liner of claim 1, wherein the central portion is a casting and the first material comprises iron.

5. The elevator sheave liner of claim 1, wherein the engagement surface comprises a dovetail profile.

6. The elevator sheave liner of claim 1, wherein the outer portion is over-molded onto the central portion.

7. An elevator sheave assembly, comprising:
a sheave including a first surface parallel to an axis of rotation of the sheave;
a rigid sheave liner made of a first material, the sheave liner having an inner surface received adjacent the first surface, the sheave liner having an outer surface defining a traction surface that is configured to receive an elevator tension member; and
a resilient layer made of a second material and secured to one of the sheave and the rigid sheave liner, the resilient layer being between the sheave and the rigid sheave liner, the resilient layer having an exterior profile that cooperates with surfaces on the other of the rigid sheave liner and the sheave to secure the rigid sheave liner to the sheave.

8. The elevator sheave assembly of claim 7, wherein
the resilient layer is secured to the rigid sheave liner;
the sheave includes retaining surfaces that are transverse to the first surface;
the retaining surfaces have a dovetail profile;
the exterior profile of the resilient layer defines engagement surfaces that engage the retaining surfaces; and
the engagement surfaces have a corresponding dovetail profile.

9. The elevator sheave assembly of claim 8, wherein
the sheave liner includes an inner surface received adjacent the first surface of the sheave;
the inner surface is situated at a first radial distance from the axis of rotation;
the outer portion includes an inner ledge; and
the inner ledge is situated at a second, larger radial distance from the axis of rotation.

10. The elevator sheave assembly of claim 7, wherein the sheave liner is snap-fit onto the sheave.

11. The elevator sheave assembly of claim 7, wherein
the first material comprises metal; and
the second material comprises a polymer.

12. The elevator sheave assembly of claim 11, wherein the second material comprises an elastomer.

13. The elevator sheave assembly of claim 11, wherein the second material comprises a thermoplastic polyurethane.

14. The elevator sheave assembly of claim 11, wherein the rigid sheave liner comprises a casting and the first material comprises iron.

15. The elevator sheave assembly of claim 7, wherein the resilient layer is over-molded onto the one of the sheave and the rigid sheave liner.

16. The elevator sheave assembly of claim 7, wherein
the resilient layer is secured to the sheave;
the exterior profile includes retaining surfaces that are transverse to the first surface; and
the rigid sheave liner has an exterior that includes engagement surfaces that engage the retaining surfaces.

17. The elevator sheave assembly of claim 16, wherein
the retaining surfaces establish a dovetail profile; and
the engagement surfaces establish a corresponding dovetail profile.

18. The elevator sheave liner of claim 1, wherein
the resilient outer portion is secured to each of two surfaces on the rigid central portion,
the two surfaces are transverse to the traction surface, and
the engagement surface has a dovetail profile.

* * * * *